March 17, 1959
J. G. INGRES
2,877,745
BOOSTER MOTOR MECHANISM
Filed Oct. 13, 1955
2 Sheets-Sheet 1
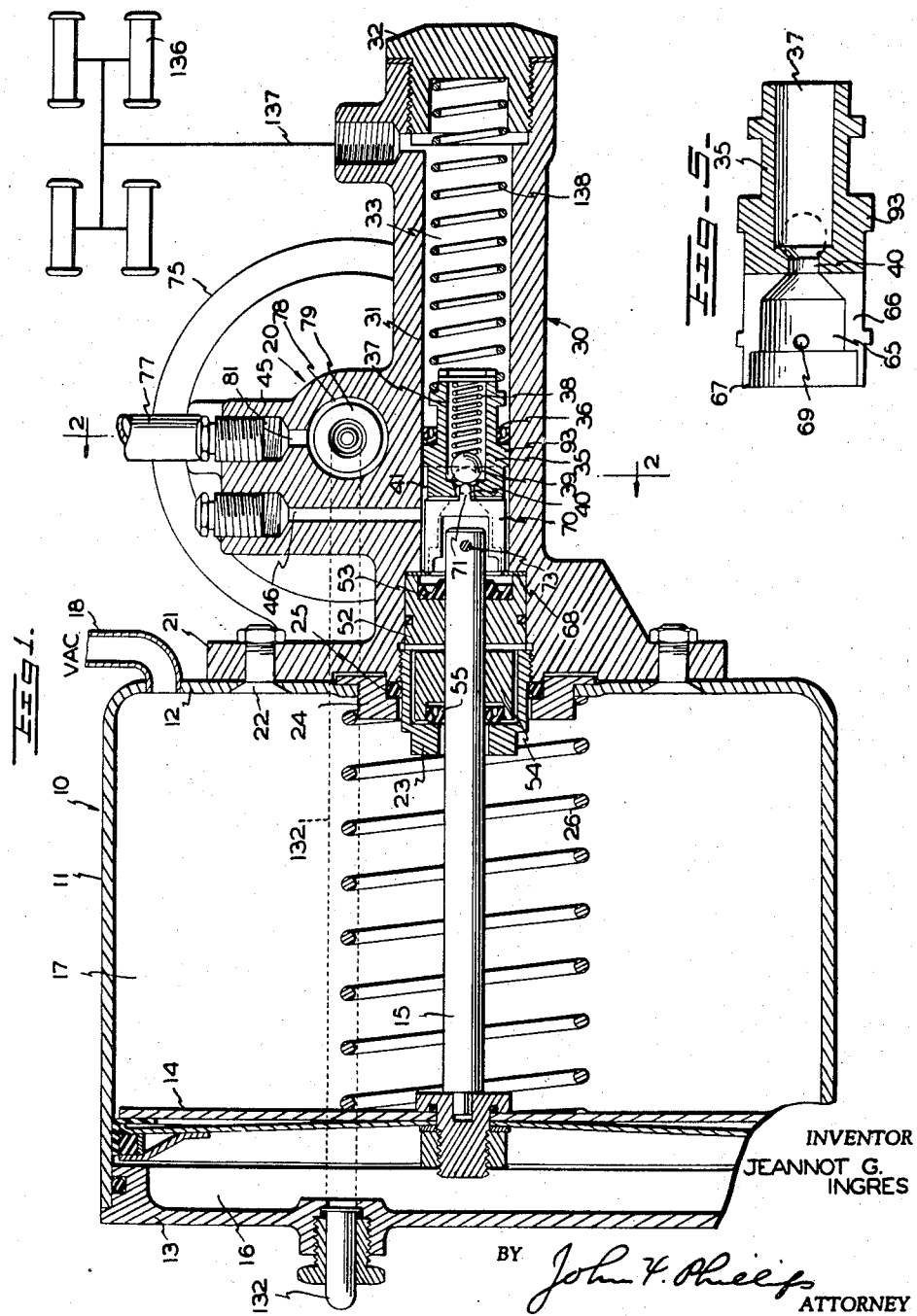
INVENTOR
JEANNOT G. INGRES
BY John F. Phelps
ATTORNEY

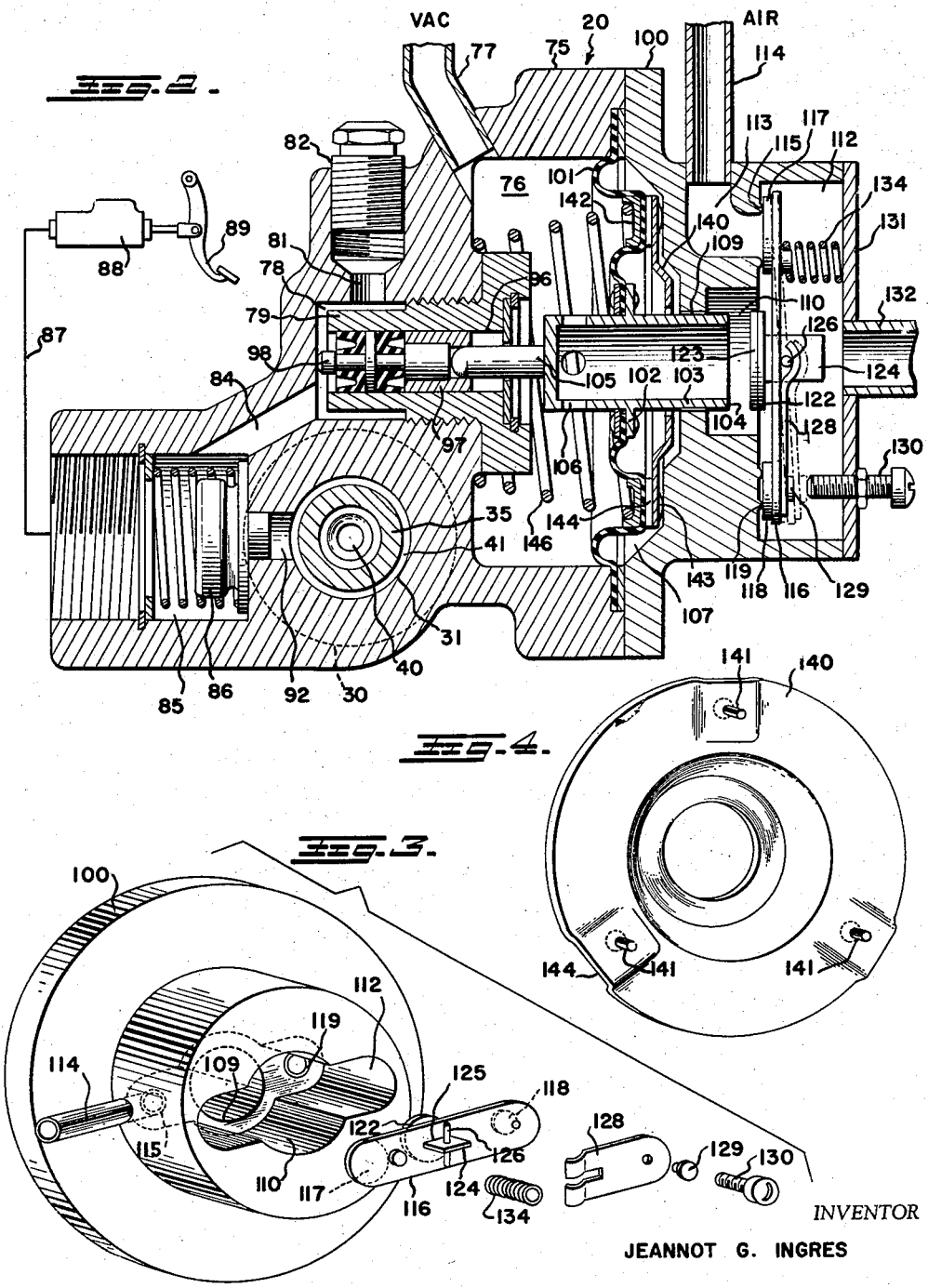

United States Patent Office 2,877,745
Patented Mar. 17, 1959

2,877,745

BOOSTER MOTOR MECHANISM

Jeannot G. Ingres, Dearborn, Mich., assignor to Kelsey-Hayes Company, a corporation of Delaware Application October 13, 1955, Serial No. 540,240

2 Claims. (Cl. 121—38)

This invention relates to a booster motor mechanism and is an improvement over the structures shown in my copending applications Serial No. 531,437, filed August 30, 1955, and Serial No. 531,661, filed August 31, 1955, now Patent No. 2,805,647, granted September 10, 1957.

In my copending applications referred to above, I have disclosed a booster brake mechanism of the type employing a booster motor operable for transmitting a force to a fluid displacing plunger, slidable in a hydraulic chamber, for displacing fluid into the vehicle wheel cylinders. The booster motor is of the elastic fluid pressure type and is controlled by a valve mechanism operable by hydraulic fluid displaced from a conventional master cylinder upon operation of the pedal thereof. The fluid displaced from the master cylinder is utilized back of the hydraulic fluid displacing plunger referred to, for assisting the motor in applying force to the plunger to displace fluid into the brake lines.

In a booster brake mechanism of the character referred to, the operator performs part of the work of applying the brakes and feels through the brake pedal a hydraulic reaction proportionate to the hydraulic pressure developed in the brake cylinders. The valve mechanisms of the pending applications referred to cooperate in novel ways with the remainder of the system to provide an initially "soft" pedal which is highly desirable in an apparatus of this kind, resistance to operation of the brake pedal progressively increasing as the brake is applied. The valve mechanism of the copending applications are of such natures as to effect initial relatively restricted energization of the booster motor, thus eliminating one of the faults of earlier constructions of this type wherein too sudden energization of the motor causes the pressure responsive unit thereof to "jump" away from normal position to build up too rapidly hydraulic pressures in the brake lines and wheel cylinders.

Because of the highly advantageous operation of the valve mechanisms of the copending applications referred to, it is wholly practicable to feed hydraulic fluid without restriction from the master cylinder to the valve operating mechanism, and to provide a residual pressure valve between the master cylinder and the space in the hydraulic plunger chamber, back of the plunger, to which hydraulic fluid from the master cylinder is supplied for assisting in the motor operation. Under such conditions, the motor will be initially energized to a restricted extent, thus applying force to the fluid displacing plunger prior to the applying of master cylinder pressures back of the plunger. This has been found to provide a remarkably smoothly operating booster brake mechanism, free of substantial "lumpiness" in operation.

In the structures of both of the copending applications, a diaphragm is connected to the valve mechanism in such a way that as motor operating fluid pressure is released by the valve mechanism to actuate the motor, such pressure applied to the diaphragm is transmitted to the operator's foot to provide initial relatively light reaction as the motor is energized and before hydraulic reaction is transmitted to the operator's foot. This subjection of the aforesaid diaphragm to motor energizing fluid pressure is accomplished by admitting such pressure through a relatively restricted opening which, because of the difficulty of controlling the exact rate of flow of such fluid pressure, may provide a too rapid increase of pressure affecting the diaphragm.

An important object of the present invention is to provide an apparatus of the character referred to wherein the reaction diaphragm connected to the valve mechanism is provided with biasing means acting only on a part of the diaphragm to tend to hold such part in normal position whereby, during initial motor energization, only the remaining part of the diaphragm is subjected to motor energizing fluid pressures to react against the brake pedal, thus tending more uniformly to preserve the "softness" of the initial brake pedal operation.

A further object is to provide such a mechanism wherein the diaphragm has the portion of its area subjected to initial motor energizing fluid pressures connected to an element which controls connection of a vacuum source to the booster motor, the biasing means employed in conjunction with the diaphragm not affecting the vacuum valve operating portion of the diaphragm, thus permitting predetermined initial motor energizing pressures to back off the vacuum valve controlling means to cut off connection of the booster motor with the source of vacuum to provide an accurately responsive follow-up action of the valve mechanism with a smooth valve operation and at the same time delay the transmission to the brake pedal of the elastic fluid pressure reaction occurring incident to energization of the booster motor.

A further object is to provide such an apparatus wherein the diaphragm and associated elements render the vacuum valve responsive to fluid pressure forces wholly without being influenced by the biasing spring associated with the diaphragm, thus permitting the elimination of a return spring for the vacuum valve device.

A further object is to provide such a brake system wherein the use of the biasing spring associated with the diaphragm withholds full diaphragm reaction pressures until hydraulic brake line pressures equal elastic fluid pressures in the control chamber from which elastic fluid pressure is admitted to the motor to energize it, thus providing for a perfectly smooth transition from elastic fluid pedal reactions to reactions occurring in accordance with hydraulic line pressures.

Other objects and advantages of the invention will become apparent during the course of the following description.

In the drawings I have shown one embodiment of the invention. In this showing:

Figure 1 is an axial sectional view through a booster mechanism embodying the invention, parts being broken away and parts being diagrammatically shown;

Figure 2 is an enlarged sectional view on line 2—2 of Figure 1;

Figure 3 is a perspective view of the valve elements and the parts associated therewith, as illustrated in Figure 2;

Figure 4 is a perspective view of a plate associated with the reaction diaphragm; and Figure 5 is a detail axial sectional view through the fluid displacing plunger.

Referring to Figure 1, the mechanism comprises a booster motor indicated as a whole by the numeral 10 and comprising a cylinder 11 having a preferably integral head 12 at one end thereof. The opposite end of the cylinder is closed by a separate head 13. The motor is shown in the present instance as being of the piston type, a piston 14 of any desired type being mounted to reciprocate in the cylinder 11 and provided with a piston rod 15, movable to the right in Figure 1 when the motor is energized. The piston 14 is shown in its normal position in Figure 1 and the piston divides the cylinder 11 to form a variable pressure chamber 16 and a constant pressure chamber 17. In the present instance the motor is of the vacuum suspended type, and the chamber 17 is in constant communication with a source of vacuum (not shown) through a duct 18.

Adjacent the cylinder head 12 is arranged a preferably cast body 20 having a cylindrical flange 21 bolted as at 22 to the cylinder head 12. A hollow nut 23 surrounds the piston rod 15 and is threaded into the adjacent end of the body 20. An annular member 24 is fixed relative to the head 12 and flange 21 and cooperates with the body 20 to form an annular recess receiving a seal 25 surrounding the nut 23. A piston return spring 26 seats at one end against the piston 14 and at its other end against the head 12, as shown in Figure 1.

A cylindrical axial extension 30 forms a part of the body 20 and is provided therein with a bore 31 closed at one end by a cap 32 forming with the bore 31 a hydraulic chamber 33. A plunger 35 is slidable in the bore 31 and is sealed with respect thereto by a double-lipped cup 36 surrounding the plunger 35. This plunger has a bore 37 in which is arranged a spring 38 engaging a ball valve 39 and urging the latter to the left in Figure 1 to tend to close a port 40 (Figures 1 and 5) communicating between the bore 37 and the left-hand end of the bore 31, the latter portion of such bore forming an inlet chamber 41 for a purpose to be described.

An integral laterally extending enlargement 45 is formed on the body 20. In one side of such enlargement is formed a passage 46 communicating at one end with the chamber 41 and provided at its opposite end with a conventional bleed plug forming no part of the present invention.

A bearing 52 is mounted in the left-hand end of the body 20 and provided with a double-lipped seal 53 having its inner lip slidably surrounding the piston rod 15 to prevent leakage of hydraulic fluid along the piston rod. The bearing 52 axially guides the piston rod 15. A second piston rod bearing 54 is mounted to float laterally in the nut 23 and is sealed as at 55 with respect to the piston rod 15.

The plunger 35 extends to the left of the port 40 (Figures 1 and 5), and is provided with an axial recess as at 65 and is diametrically slotted as at 66. The left-hand extremity 67 of the plunger seats against a washer 68 (Figure 1) maintained in position by the bearing 52. Opposite sides of the slotted portion of the plunger are provided with alined openings 69. Within the slot 66 is arranged a flat substantially U-shaped member 70 the extremities of the arms of which seat against the washer 68 to limit movement of such member toward the left in Figure 1. The member 70 has an axial extension 71 projecting through the port 40 and normally unseating the ball 39. The right-hand end of the piston rod 15 extends into the plunger recess 65, between the arms of the member 70, and is provided with a transverse pin 73 extending through the openings 69. This pin positively connects the piston rod 15 to the plunger 35.

An annular enlargement 75 is formed on the body 20 and has its axis arranged above and at right angles to the axis of the bore 31. The enlargement 75 has formed therein a vacuum chamber 76 communicating through a line 77 with a suitable source of vacuum. The body 20 is further provided with a small chamber 78 into which projects one end of a nut 79 threaded into the body 20. The chamber 78 is provided with a vent passage 81 having at its upper end a conventional bleed plug 82.

The chamber 78 communicates through a passage 84 with a chamber 85 in which is arranged a conventional residual pressure valve 86 (Figure 2). The chamber 85 communicates through a line 87 with a conventional master cylinder 88 having the usual piston (not shown) operable by a pedal 89 to displace fluid into the chamber 85. When pressure in the chamber 85, developed by the operation of the brake pedal 89, attains a sufficient force for such purpose, the residual pressure valve 86 opens for the flow of fluid through a port 92 into the chamber 41. The port 92 is shown in dotted lines in Figure 1 slightly offset to the left of the ball valve 39. It will be noted that this port is back of an annular flange 93 formed on the plunger 35 against which the seal 36 seats. Accordingly, hydraulic pressure generated by the master cylinder, entering the chamber 41, tends to force the plunger 35 toward the right in Figure 1, but only after the motor 10 is energized as described below.

The nut 79 is provided with a bore 96 slidably receiving a sealed plunger 97 having at one end a reduced stem 98 engageable with the end wall of the chamber 78. Accordingly, movement of the plunger 97 is limited to its normal off position shown in Figure 2.

The free end of the annular enlargement 75 is provided with a cap member 100. Between this cap member and the end of the enlargement 75 is clamped a diaphragm 101. The inner edge of such diaphragm is clamped against an annular flange 102 formed on a tubular member 103, the right-hand extremity 104 of which (Figure 2) forms a vacuum valve seat, as further described below. The member 103 is provided with an axial stem 105 arranged to be actuated by the plunger 97 to move the member 103 to the right in Figure 2 for a purpose to be described. The tubular member 103 is provided with ports 106 so that the interior of the member 103 is always in communication with the vacuum chamber 76. The assembly of elements 103 and 105 and the radially inner portion of the diaphragm 101 is not spring-biased to the left to its normal position, this being unnecessary, as will become apparent below. A chamber 107 is formed between the cap 100 and diaphragm 101, and pressures in this chamber vary in a manner and for a purpose to be described, the variable pressures in the chamber 107 being utilized in a novel manner to assist in the proper performance of the mechanism.

The tubular member 103 extends through an opening 109 formed in the cap member 100. The member 103 is freely slidable in the opening 109 to permit seepage of fluid in both directions past the member 103. The cap member 100 is recessed at 110 to provide a chamber normally communicating with the interior of the member 103. The cap member 100 is provided further with a chamber 112, forming the control chamber to determine pressures in the motor 10, as will become apparent. An air port 113 communicates with one end of an air duct 114, the other end of which is preferably provided with an air cleaner (not shown). The inner end of the port 113 terminates in a raised annular rib 115 forming an air valve seat.

A lever 116 is mounted in the chamber 112, and this chamber, as shown in Figure 3, is relatively narrow. One end of the lever 116 is provided with a resilient poppet valve 117 normally closing the valve seat 115. The lever 116 is provided at its other end with a spacer washer 118 engageable with an annular raised rib 119 which tends to assist in maintaining the lever 116 square with respect to the seat 115, thus assisting in accurately seating the air valve 117.

A disk 122 is provided with a resilient vacuum valve 123 adapted to seat against the vacuum valve seat 104. The disk 122 is provided with a relatively flat valve stem 124 extending loosely through an opening 125 (Figure 3) formed in the lever 116, thus permitting the valve 123 to rock within reasonable limits relative to the lever 116 to seat squarely on the vacuum seat 104. At the side of the lever 116 opposite the valve disk 122, a pin 126 extends through the stem 124 and is engageable by the curved adjacent end of a spring clip 128 the lower end of which, as viewed in Figure 2, is secured to the lever 116 by a rivet or similar fastening element 129.

This rivet is engageable under conditions to be described with the inner end of a screw 130 threaded through a cover plate 131 secured to the adjacent end of the cap member 100 and forming a closure for the chamber 112.

A motor control conduit 132 communicates at one end with the chamber 112 through the cap 131 and extends throughout the length of the motor 10 (Figure 1) for connection with the head 13 to communicate with the variable pressure chamber 16. A spring 134 (Figure 2) engages at one end against the cover plate 131 and at its inner end against the lever 116, the spring being offset downwardly, as viewed in Figure 2, from the axis of the air valve seat 115.

The valve mechanism as thus far described functions substantially in accordance with the disclosure in my patent referred to above. It will be understood that the present booster system as a whole is largely illustrative of the use of the valve mechanism, and that the valve mechanism may be used with other types of booster mechanisms. For example, the tubular member 103 may be directly pedal-actuated, although it will become more apparent that the functioning of the valve mechanism is particularly efficient when utilized in a system such as that shown in Figure 2 wherein hydraulic fluid from the master cylinder operates the valve mechanism. Moreover, the apparatus may be employed in conjunction with a type of booster brake mechanism wherein separate fluid chambers are employed for the front and rear motors. It is to be understood, however, that for the purpose of illustration the present system has been shown for displacing fluid into all four wheel cylinders of a four-wheeled vehicle.

The wheel cylinders have been indicated in Figure 1 by the numeral 136, and fluid flows from the chamber 33 to the wheel cylinders through suitable hydraulic lines 137. The piston 35 is operated in the present instance both by the power of the motor and by the pressure of fluid displaced from the master cylinder, and the piston 35 is biased to its normal off position by a spring 138.

In the copending application referred to, the unseating of the valve 123 (Figure 2) connects chambers 110 and 112 to the source of vacuum through the member 103 and ports 106. Pressures accordingly will be vacuum-balanced in the chambers 76 and 107. As further described below, the engagement of the vacuum valve seat 104 with the valve 123 and the opening of the valve 117 admits air from port 113 into the chamber 112 and thence into the motor chamber 16 (Figure 1). Air will seep relatively rapidly through opening 109 (Figure 2), thus acting to the left against the diaphragm 101 to provide elastic fluid reaction against movement to the right of the tubular member 103. The arrangement as thus disclosed in the copending application referred to provides a soft initial brake action, as desired, and comprises an important contribution to the art. The present construction, however, smooths out the reaction on the brake pedal and coordinates the elastic fluid reaction against the diaphragm 101 with the hydraulic reaction transmitted to the brake pedal from the chamber 33 (Figure 1) through plunger 35 when the brakes are in operation.

Referring to Figure 2, the numeral 140 designates a plate shown in perspective in Figure 4. This plate is arranged in the chamber 107 and is provided with rivets 141 for securing it to an annular spring seat 142 engaging the opposite face of the diaphragm 101. The rivets 141 are provided with heads 143 engaging the cap member 100 and serving to prevent the plate 140 from tightly engaging against the member 100. The body of the plate 140 is prevented from seating tightly throughout its circumference against the diaphragm 101 by stamped offset projections 144 formed in the plate 140 and carrying the rivets 141. The offsets 144 may be of any desired number. Two of these offsets have been shown diametrically opposite each other in Figure 2 for the purpose of illustration, although three offsets 144 need be used as shown in Figure 4. The inner periphery of the plate 140 is spaced from the member 103 and, accordingly, it will be apparent that all portions of the chamber 107 will be subject to variations in pressure in the chamber 110.

A spring 146 is interposed between the inner wall of the vacuum chamber 76 and the spring seat 142 to urge the adjacent portion of the diaphragm toward the right to the normal position shown in Figure 2. It will become apparent that increases in pressures in the chamber 107 will affect only the radially inner portions of the diaphragm and transmit forces to the tubular member 103 until the pressures in the chamber 107 are sufficient to overcome the loading of the spring 146.

*Operation*

The parts normally occupy the positions shown in Figures 1 and 2. The motor chamber 17 is constantly connected to the source of vacuum through the duct 18. As indicated in Figure 2, the valve 117 is normally closed and the valve 123 normally open, and accordingly the variable pressure chamber 16 of the motor will communicate through duct 132, chambers 112 and 110, through member 103 and ports 106 with the vacuum chamber 76, this chamber being constantly subject to vacuum through its connection 77 with the vacuum source.

The apparatus is operated by depressing the brake pedal 89 (Figure 2) to displace master cylinder fluid through line 87 into chamber 85. A predetermined pressure must be built up in this chamber before the residual pressure valve 86 will open to supply hydraulic fluid under pressure through passage 92 into the chamber 41. However, hydraulic fluid flows freely from the chamber 85 through passage 84 into chamber 78. Inasmuch as resistance to movement of the plunger 97 and tubular member 103 to the right will be limited solely to friction around the surface of the plunger 97, the elements referred to move relatively freely to the right as viewed in Figure 2. It will be noted that, under the normal conditions referred to, vacuum will be present in the chamber 107 and, accordingly, there will be no differential pressures acting on the diaphragm 101 tending to oppose movement of the member 103 to the right.

The tubular member 103 will be moved to the right to engage the vacuum seat 104 with the valve 123, thus disconnecting the chamber 110 from the vacuum chamber 76. Slight additional movement of the member 103 will rock the lever 116, the upper extremity of the valve seat 115, as viewed in Figure 2, acting as a fulcrum for the lever to "crack" the lower portion of the valve seat 115 for the relatively restricted admission of air from the port 113 into the chamber 112, thence through duct 132 to the motor chamber 16 (Figure 1). It will be apparent that since the spring 134 is arranged between the axes of the air and vacuum valves, such spring tends to hold the air valve on its seat. The substantial leverage afforded in the operation, however, is such that little force is required to "crack" the valve 117 in the manner described.

It will be apparent, therefore, that while the valve operation initially takes place relatively freely, motor energization initially occurs to a substantially restricted extent, thus providing for a more gradual initial energization of the motor 10. Accordingly, there will be no tendency for the piston 14 to "jump" away from its normal position, a fault present in many booster mechanisms.

The movement of the lever 116 in the manner described takes place until the rivet 129, acting as a stop, engages the screw 130. Further movement imparted to the lever 116 by the tubular member 103 will then cause the lever to fulcrum on the screw 130, whereupon the other end of the lever will move rapidly to unseat the valve 117. Thus the motor will become fully energized.

Inasmuch as the chamber 110 is cut off from the source of vacuum and air is admitted to this chamber, pressure in the chamber 107 will start to build up due to leakage of air through the opening 109. Thus in the initial stages of brake operation and upon initial energization of the motor 10, a progressive elastic fluid reaction against movement of the member 103 and plunger 97 will be provided. This reaction will progressively increase as pressure in the chamber 107 increases, but in initial stages of brake operation the spring 146 prevents movement to the left in Figure 2 of the portion of the diaphragm 101 controlled thereby.

The radially outer limit of the effective elastic fluid reaction area opposing movement of the plunger 97 will be a circle halfway between the outer periphery of the flange 102 and the radially inner extremity of the spring seat 142. All pressures inwardly of this circle will be transmitted to the tube 103. It will be appreciated, of course, that part of the effective pressure area referred to will be made up by the valve disk 122, the valve 123 being tightly engaged against the seat 104. Pressures acting outwardly of the circle described will be absorbed by the spring seat 142, held for the time being in its normal position by the spring 146.

The total pressure acting against the circular area referred to will progressively increase as pressure in the chamber 107 progressively increases, as will be apparent. In the meantime, master cylinder-generated pressures in the chamber 85 will open the residual pressure valve 86 and admit hydraulic fluid under pressure into the chamber 41. Motor energization having been started, the plunger 35 will be moving to the right in Figure 1 and master cylinder pressures will be added to motor forces to generate brake applying pressures in the chamber 33 and in the wheel cylinders 136.

It will be apparent that pressures in the chamber 107 will be present throughout the area of the right-hand side of the diaphragm 101. But up to the point where the loading of the spring 146 is overcome, differential pressures will affect only the circular reaction area described above. When a predetermined pressure has been built up in the chamber 107, pressures acting on the diaphragm 101 will move it to the left against the loading of the spring 146 and will finally reach a point where the differential pressures in chambers 76 and 107 throughout the area of the diaphragm 101 will provide reaction forces against the tubular member 103 and plunger 97. The structure including the spring 146 is so designed that elastic fluid reaction acting to the left against the plunger 97, and which reaction is transmitted to the brake pedal, equals a hydraulic line pressure in the brake lines of approximately 90-100 p. s. i., or which is approximately when the brake shoes contact the drums. Thus it will be apparent that a progressive elastic fluid reaction is provided to increase pedal reaction, starting from a very low point, and equaling hydraulic line pressures at a predetermined point, at which time increased hydraulic line pressures will assume the function of providing reaction against the brake pedal 89.

From the foregoing it will be apparent that the present apparatus provides quite a soft initial brake pedal action with smooth progressive reactions without any sudden increase or dropping off of the reaction at the time the major reaction function is taken over in accordance with hydraulic line pressures. An extremely smooth brake operation is thus provided. Moreover, the functioning of the valve mechanism to provide initial restricted energization of the booster motor eliminates any "jumping" of the piston 14 accompanied by sudden increases in pressure in the hydraulic chamber 33. This motor control action coordinates perfectly with the functioning of the elastic fluid reaction means and provides a brake operation superior to anything heretofore attained.

The flow of hydraulic fluid from the master cylinder to the valve operating chamber 78 is unrestricted. Of course, the master cylinder 88 is provided with a conventional residual pressure valve, but this offers minor and conventional resistance to the flow of hydraulic fluid from the master cylinder through the line 87. However, the presence of the residual pressure valve 86 prevents initial flow of hydraulic fluid through passage 92 and, accordingly, insures initial motor energization before hydraulic fluid flows to the chamber 41 back of the plunger 35. Therefore, when relatively gradual brake applications are made, there is a lag between initial motor operation of the plunger 35 and the flow of fluid past residual pressure valve 86 by the force generated by the brake pedal. However, under such conditions, a drop in pressure in the chamber 41 will insure the prompt opening of the residual pressure valve 86 for the flow of hydraulic fluid through the passage 92. Thereafter, master cylinder pressures will be duplicated in the chamber 41 to assist the booster motor in transmitting force to the plunger 35, and this additional force is limited only by the ability of the operator to exert foot pressure against the pedal 89.

Of no specific importance in connection with the present application is the functioning of the member 70 (Figure 1). The projection 71 of this member normally unseats the ball valve 39 to connect chambers 33 and 41. As soon as the plunger 35 starts to move to the right, the spring 38 closes the valve 39 and pressure will be built up in the chamber 33, as stated.

It also will be apparent that the degree of energization of the motor will depend upon the extent of axial displacement of the member 103 to actuate the valve lever 116 which, in turn, is dependent upon the extent of depression of the brake pedal, regardless of reaction forces transmitted to the brake pedal. Therefore, the apparatus provides a perfect follow-up valve operation, as will be obvious.

The manner in which the parts will return to normal position will be obvious and is described in the copending application referred to above. As in such copending application, no spring need bias the members 103 and 97 to their normal positions. When the brake pedal is released, there will be a pressure drop in the chamber 78 (Figure 2), and air pressure in the chamber 107 and in the control chamber acting against the disk 122 will combine to move the parts to the point at which the air valve 117 engages its seat. Thereafter, pressure in the chamber 107, acting on the radially inner portion of the diaphragm 101, will return the members 103 and 97 to their normal positions. If pressure is not retained a sufficient length of time in the chamber 107 for this purpose, the plunger 97 will be pulled to its off position by retraction of fluid through passage 84. When vacuum is re-established in the control chamber 112, it will be re-established in the motor chamber 16 and the return spring 26 will return the motor piston 14 to its normal position. When the parts return to normal position, the ends of the arms of the member 70 (Figure 1) will engage the washer 68 to arrest movement of the member 70. The plunger 35 will move a slight additional distance to engage its end 67 against the washer 68 and in this last increment of movement, the projection 71 will unseat the ball valve 39.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster mechanism comprising a fluid pressure motor having a casing and a pressure responsive unit therein forming therewith a variable pressure chamber, a control chamber communicating with said variable pressure chamber, a high pressure valve seat and a low pressure valve seat opening into said control chamber, high and low pressure valves respectively engaging said seats, a lever carrying said valves, a spring engaging said lever to bias said high pressure valve to closed position, a tubular member axially alined with said low pressure valve and carrying said low pressure seat, a diaphragm having a freely movable radially inner portion connected to said tubular member, casing means carrying the outer periphery of said diaphragm and forming therewith a pair of elastic fluid chambers one of which is connected to a low pressure source and the other of which communicates with said control chamber, and a compression spring in said one elastic fluid chamber engaging radially outer portions of said diaphragm to oppose movement thereof upon increases in pressure in the other of said elastic fluid chambers until such pressure increases to a predetermined point.

2. A mechanism according to claim 1 provided with a hydraulic cylinder, an operating plunger in such cylinder connected to said tubular member to move said low pressure seat into engagement with said low pressure valve to close the latter and open said high pressure valve, and pedal operated fluid displacing means connected to said hydraulic cylinder.

References Cited in the file of this patent

UNITED STATES PATENTS

| | | |
|---|---|---|
| 2,332,340 | Price | Oct. 19, 1943 |
| 2,393,524 | Fant | Jan. 22, 1946 |
| 2,462,015 | Whitten | Feb. 15, 1949 |
| 2,672,015 | Adams | Mar. 16, 1954 |
| 2,685,170 | Price | Aug. 3, 1954 |
| 2,690,740 | Hupp | Oct. 5, 1954 |